Figure 1:
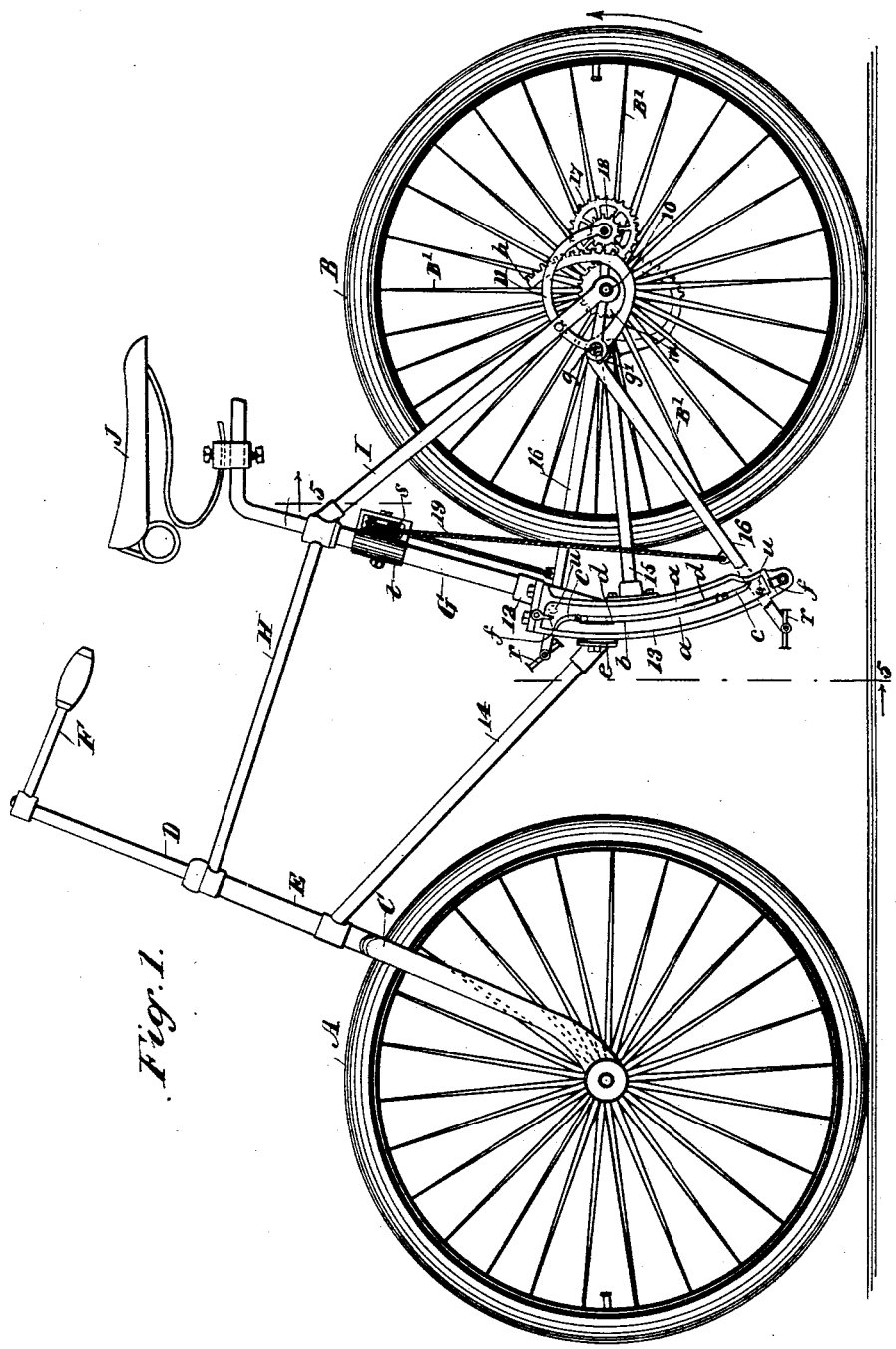

(No Model.) 3 Sheets—Sheet 1.

C. P. LABATT.
MECHANICAL MOTOR FOR BICYCLES OR OTHER PURPOSES.

No. 586,443. Patented July 13, 1897.

WITNESSES:

INVENTOR
BY
ATTORNEYS.

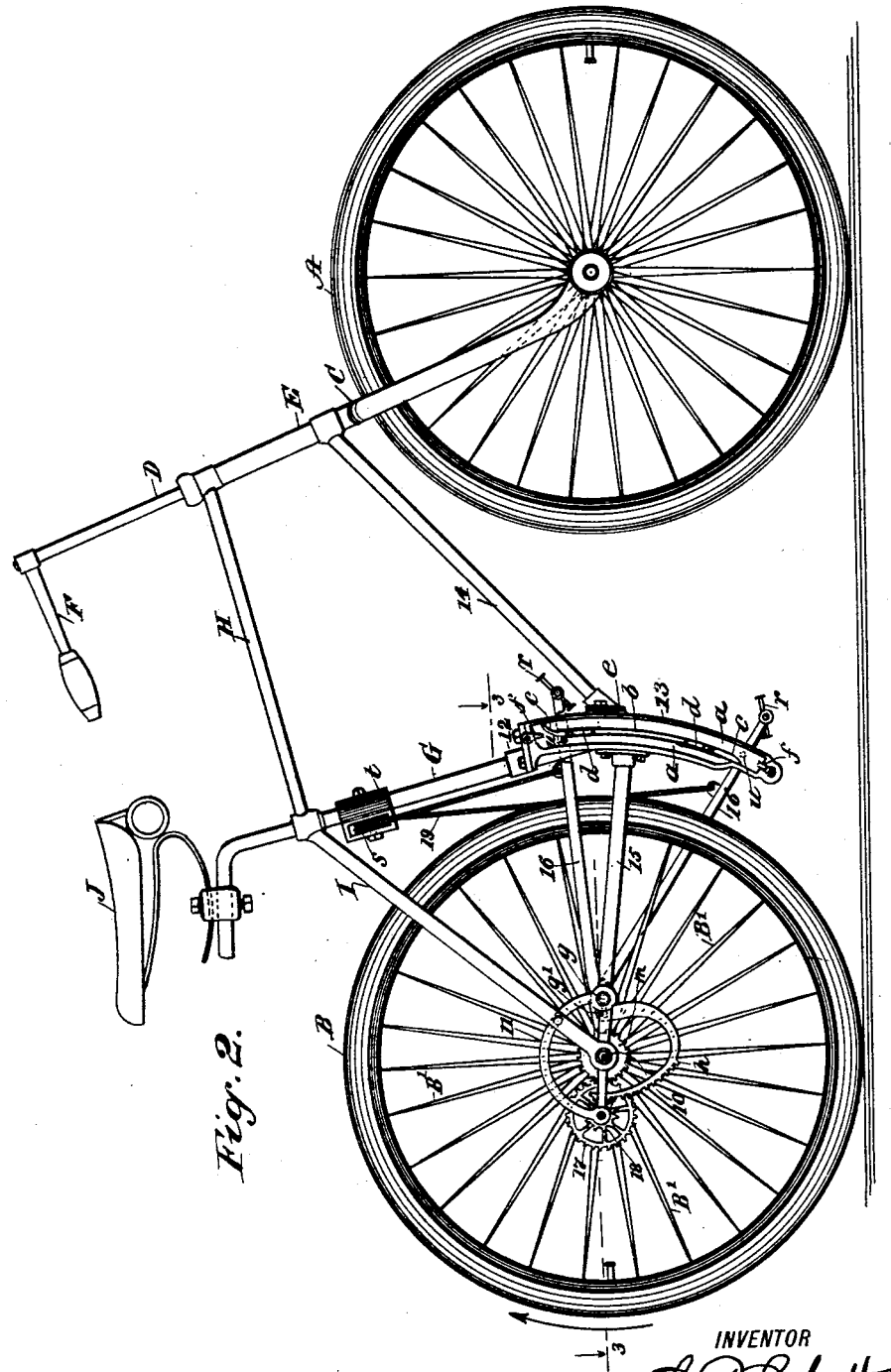

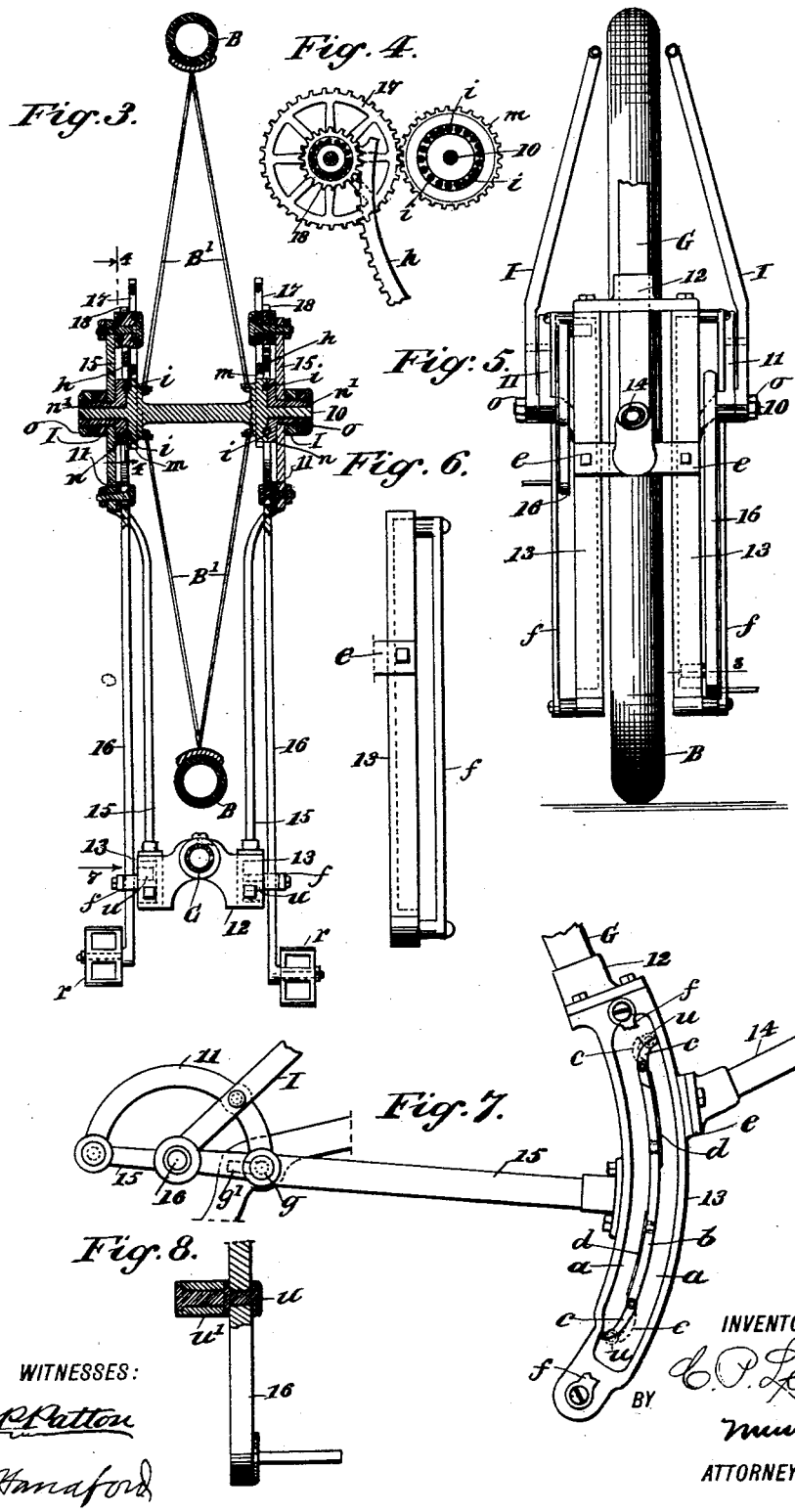

United States Patent Office.

CHARLES P. LABATT, OF LOS ANGELES, CALIFORNIA.

MECHANICAL MOTOR FOR BICYCLES OR OTHER PURPOSES.

SPECIFICATION forming part of Letters Patent No. 586,443, dated July 13, 1897.

Application filed July 28, 1896. Serial No. 600,752. (No model.)

*To all whom it may concern:*

Be it known that I, CHARLES P. LABATT, of Los Angeles, in the county of Los Angeles and State of California, have invented a new and Improved Mechanical Motor for Bicycles or other Purposes, of which the following is a full, clear, and exact description.

This invention relates to a novel foot-power device that is preferably utilized for the propulsion of bicycles, but which may also be employed as a means for driving small stationary machines of different kinds.

The invention consists in the novel construction and combination of parts, as is hereinafter described, and pointed out in the claim.

Reference is to be had to the accompanying drawings, forming a part of this specification, in which similar characters of reference indicate corresponding parts in all the figures.

Figure 1 is a side elevation of a bicycle having the improvements. Fig. 2 is a side view of the improved motor mechanism on a bicycle, showing the relative adjustment of parts on the side of the machine that is opposite from that represented in Fig. 1. Fig. 3 is a sectional plan view substantially on the line 3 3 in Fig. 2. Fig. 4 is an enlarged partly-sectional side view of details essentially on the line 4 4 in Fig. 3, showing accelerating-gearing at one side of the bicycle, said gearing being duplicated at the opposite side of the bicycle. Fig. 5 is a front elevation of the improved motor device on a bicycle-frame, partly in section, on the line 5 5 in Fig. 1. Fig. 6 is an enlarged detached front view of one of the guide-boxes forming part of the improvement. Fig. 7 is an enlarged side view of one of the guide-boxes and the attachments thereto, shown in part; and Fig. 8 is an enlarged partly-sectional plan view on the line 8 in Fig. 5, showing the construction of a roller connection for one of the pedal-levers of the motor.

In the application of the improved motor mechanism to a bicycle the improvements are represented as mounted upon a bicycle of the so-called "safety" type, having the well-known diamond frame, and in the drawings A and B respectively indicate the front and rear traction-wheels of such a vehicle.

The forward wheel A is, as usual, supported to revolve by the swiveling frame-fork C, the stem D of which passes upwardly through the forward frame-post E and has the bent handle-bar F secured on its upper end at a correct height for convenient manipulation by the rider of the bicycle.

The saddle-post G is held upright and suitably inclined rearward by the top brace H, that extends from the frame-post E, and also by the usual twin braces I, that project rearward and downward from the upper part of the saddle-post in the ordinary way. On the braces I, adapted to sustain the axle 10 of the rear traction-wheel B, two similar arched frame-pieces 11 are secured intermediately of their ends. Upon the lower portion of the saddle-post G a bracket-plate 12 is secured, the limbs of which project oppositely and outward.

Two similar guide-boxes 13 are provided, which separately consist of an arched frame divided into two raceways *a* by a longitudinally-extending partition *b*, as clearly shown in Fig. 7, and at each end of the partition a switch-tongue *c* is pivoted, said tongues having their free ends normally held in contact with the inner faces of the outer side walls of the raceways by the similar plate-springs *d*.

The guide-boxes 13 are held upright and parallel with each other at equal distances from the saddle-post G by the bolted attachment of their upper ends upon the lower side of the limbs on the bracket-plate 12. The guide-boxes 13 are further sustained in position by the lower brace 14, that extends rearward from the forward post E, terminating in a bracket-piece having lateral wings *e*, bolted upon the front wall of each guide-box at a suitable distance from their ends. It will also be seen that like braces 15 are secured by their front ends upon the rear sides of the guide-boxes 13, and thence project rearward to be connected with the arched frame-pieces 11 exterior of the latter, as best shown in Fig. 3.

Two similar pedal-levers 16 form essential portions of the improved motor mechanism, each consisting of an elongated bar pivoted at a correct distance from its forward end upon the side members of the bicycle-frame, preferably at the junction of the arched pieces 11 with the frame-braces 15 at the forward terminals of said arched pieces, as shown at $g$ in Figs. 1, 2, and 3.

The rear portions of the levers 16 are similarly bent to produce depending curves thereon, which adapt these parts of the levers when the levers are vibrated to avoid contact with the axle of the rear wheel. At a suitable point rearward of the axle 10 the free ends of the levers 16 are upwardly projected and curved on a radius defined by the distance between the edges of said curved portions and the pivotal centers $g$ of the levers, gear-teeth being formed on their rear convex edges, thus affording like curved racks $h$. The rear axle 10 is at each side exterior of the wheel-hub and spokes thereon reduced in diameter, and the true outer faces of said hubs are concentrically channeled to receive antifriction-balls $i$, as best shown in Fig. 4, and the peripheries of the hubs exterior of the spokes $B'$ are toothed to afford like gears $m$.

Like outer hub-sections $n$, having hollow shanks $n'$, are loosely mounted upon the reduced stems of the rear axle 10 and are sustained in position by the threaded engagement of the screw-cut exteriors of the shanks $n'$ with tapped perforations of the frame members or braces 15, and it will be seen that the rear frame-braces I are also screwed upon the shanks mentioned, as well as the jam-nuts $o$, whereby the frame connections are rendered substantial, and the hub-sections $n$ are adapted for adjustment toward or from the adjacent stationary hub-sections wherein the balls $i$ are embedded.

Preferably the adjustable hub-sections $n$ are channeled on their true faces that are nearest the balls $i$, so that the latter may be partially seated in the grooves of said adjustable hub-sections, which will provide antifrictional ball-bearings for the rear wheel B.

On the rear ends of the braces 15 and rear terminations of the arched frame-pieces 11 similar spur-gears 17 are loosely sustained by the stud-bolts $p$, and on the outer sides of said gears smaller pinions 18 are affixed concentric therewith, both spur-gears and pinions being supported to rotate by antifrictional ball-bearings, as shown in Fig. 3, the relative arrangement of the gears and pinions also appearing in Fig. 4.

The relative proportion of the parts is such that the toothed racks $h$ at the rear ends of the pedal-levers 16 are permitted to mesh with the smaller pinions 18 and effect a complete rotation of said pinions alternately when the levers are successively depressed, as will be further explained. The pedal-levers 16 are each furnished with a suitable foot-rest or pedal $r$, which may be of any preferred construction, and said levers are connected by the flexible strap or band 19, that may be of leather or other suitable material.

The band 19 is affixed at each end upon one of the levers and between said ends is engaged with the loose pulley $s$, that is held to rotate on the saddle-post G by an adjustable bracket-frame $t$. On each lever 16, at a correct distance from the pivots $g$, studs $u$ are secured, these having antifrictional sleeves $u'$ on them, as shown in Fig. 8, and said studs are so positioned that when either is engaged with the rearmost raceway $a$ of an adjacent guide-box 13 the curved rack $h$ on said lever will be rearwardly moved, so as to have the teeth of its curved rack mesh with the pinion 18, which it is directly opposite. To effect this adjustment of parts, the levers 16 are each longitudinally slotted to produce elongated orifices for the reception of the pivots $g$, as clearly indicated by dotted lines at $g'$ in Fig. 7, which will permit the necessary longitudinal shifting movement of the levers. On the outer side of each guide-box 13 a guard-plate $f$ is secured by its ends at corresponding ends of the guide-box frame. The guard-plates are sufficiently spaced from the faces of the boxes to permit the free sliding movement of the levers 16 between them and the guide-boxes, said guard-plates being provided to prevent lateral strain or displacement of the levers from occurring in the use of the bicycle.

In assembling the parts of the mechanical motor for effective service it is necessary that the stud $u$ on one lever 16 be located in the forward raceway $a$ of the guide-box 13 it is adjacent to and the stud of the opposite lever occupy the rearmost raceway of the other guide-box. The length of the flexible connection 19 is so proportioned that the stud $u$ on one lever 16 will be located at or near the bottom of its respective raceway $a$ when the stud on the other lever is at the top of its respective raceway.

It will be apparent that the rider seated upon the saddle J may conveniently rest his feet on the pedals or foot-rests $r$ and alternately depress the pedal-levers by an easy movement of his lower limbs.

Assuming that the pedal-levers 16 are in the relative positions shown in Fig. 1, it will be seen that the stud $u$, shown by dotted lines as entered within and at the top of the rear raceway of the guide-box on the right-hand side of the bicycle, will, on the depression of the lever from which it is projected, rock the switch-tongue $c$ at the lower end of said raceway, and the stud will pass below the tongue, so as to enter the lower portion of the forward raceway.

It should be understood that when the stud on the right-hand lever 16 is positioned at the top of the right-hand guide-box within the rear raceway, as just explained, the stud $u$ on the left-hand lever will then be within the forward raceway at its lower end, as represented in Fig. 1, the position of the lever at the box being shown by dotted lines and the stud being shown in section to render the arrangement of parts clear.

The operation of the levers 16 by alternate depression will, it is evident, change their longitudinal adjustment, so as to alternately shift them as their studs *u* pass the switch-tongues *c* and mesh their racks *h* successively with the pinions 18, whereby the vibratory movement of the levers is converted into rotary motion in said pinions, that from their geared connections with the rear traction-wheel B will rotate said wheel in the direction of the curved arrows in Figs. 1 and 2 for the propulsion of the bicycle in a forward direction.

As the levers 16 have considerable length and the gearing on each side of the bicycle-frame is proportioned to increase the speed of rotary motion communicated to the axle of the rear traction-wheel B it will be apparent that the rider may propel the vehicle on which he is mounted with ease and at great speed, the provision of ball-bearings for the gearing manifestly reducing the frictional resistance of the engaged parts and greatly facilitating the operation of the mechanical motor for the propulsion of the bicycle.

Having thus described my invention, I claim as new and desire to secure by Letters Patent—

A driving-gear having a sliding lever, a guide-box having a longitudinally-extending partition forming two raceways, a pivoted spring-pressed tongue at each end of the partition, and a stud projecting from the lever and alternately moving through the raceways, substantially as described.

CHARLES P. LABATT.

Witnesses:
 CHARLES F. LABATT,
 CHARLES LABATT.